S. A. KORNSWEET.
SANITARY CASE.
APPLICATION FILED APR. 14, 1921.
1,429,082.
Patented Sept. 12, 1922.
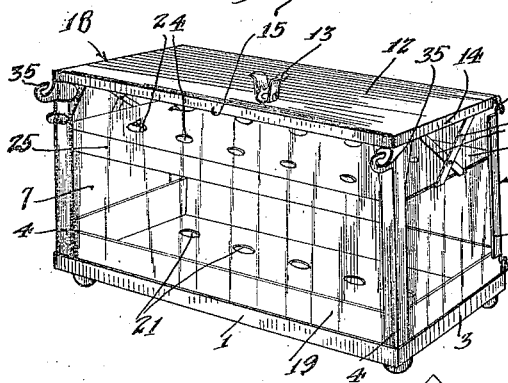
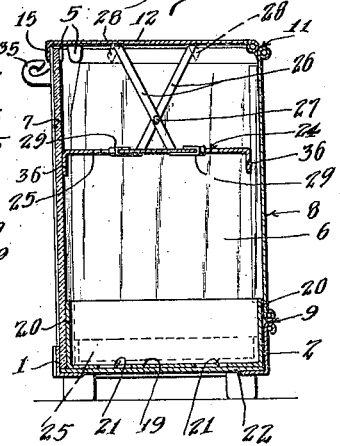
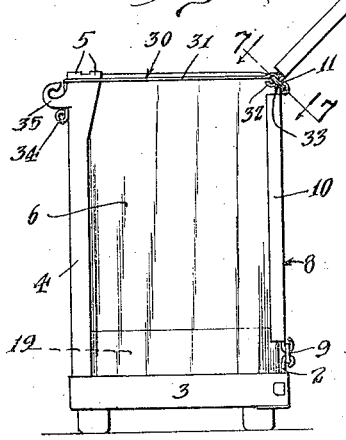
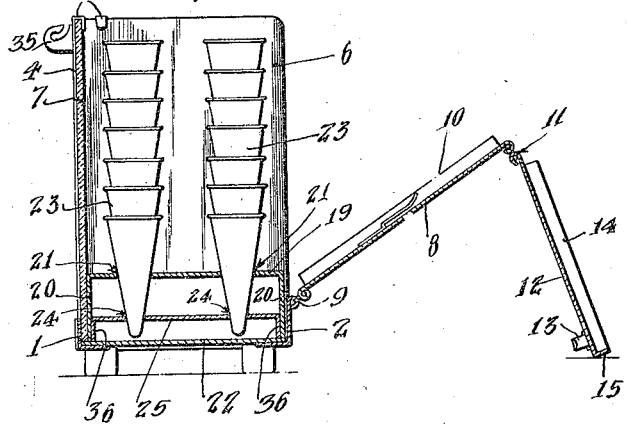
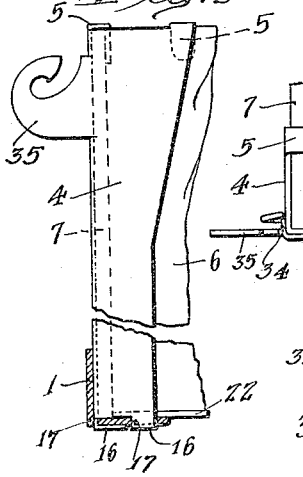
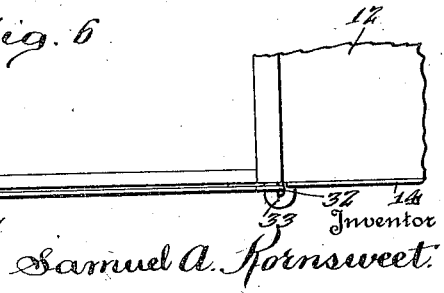
Inventor
Samuel A. Kornsweet
By Frederick Whyer
Attorney Patented Sept. 12, 1922.

1,429,082

UNITED STATES PATENT OFFICE.

SAMUEL A. KORNSWEET, OF LOS ANGELES, CALIFORNIA.

SANITARY CASE.

Application filed April 14, 1921. Serial No. 461,273.

*To all whom it may concern:*

Be it known that I, SAMUEL A. KORN-SWEET, a citizen of the United States, and a resident of Los Angeles, in the county of Los Angeles and State of California, have invented certain new and useful Improvements in Sanitary Cases, of which the following is a specification.

This invention relates to cases of the character employed for holding ice cream cones and confections of various kinds to prevent contamination thereof.

This is an improvement of the invention disclosed in my prior Patent No. 1,338,833, dated May 4, 1920.

An object of this invention is to make provision for easily and quickly adapting the case for the holding of stacks of cornucopias or cones, candy in bulk or in packages, chewing gum and the like.

In the prior patent referred to above, there is shown a member provided with perforations in which the lowermost cones or stacks of cones are placed. I provide for the same construction in this invention, and in addition I provide a supplemental perforate member and I provide suspension means for the supplemental perforate member to support the supplemental member so as to produce a shelf, upon which the articles for sale may be placed the same as in an ordinary show case.

This invention also provides means to hold the lower section of the closure in closed position while the upper section is being opened and closed, so that, if desired, the case may be filled with candy or other articles in bulk; it being essential to make the closure hinged in two section so that, when the case is used for ice cream cones, the cones can be readily reached by the attendant for taking them from the case.

The foregoing objects will be understood more readily from the fact that in countries where the temperature is quite low during a portion of the year, there is not much sale for ice cream cones in winter. Wherefore, if a storekeeper is in possession of this improved case, he may use the same for holding ice cream cones in warm weather, and may readily change the case and place on display therein chewing gum, candy and the like for the trade in colder weather.

The accompanying drawings illustrate the invention:

Figure 1 is a perspective view of a case embodying the invention, the parts being arranged as the case would be used for the display of chewing gum, chocolate and other packaged articles.

Figure 2 is a sectional elevation of the case shown in Figure 1.

Figure 3 is an end view of the case with the parts arranged as they would be when the case is used for candy or other articles in bulk, the lid being open.

Figure 4 is a sectional elevation of the case with the lid and door in open position, the parts being in the positons which they would occupy when the case is used for holding ice cream cones, stacks of which are also shown in place in the case.

Figure 5 is an enlarged fragmental detail of one corner of the case, a portion of the frame being shown in section.

Figure 6 is an enlarged fragmental plan view of Figure 3.

Figure 7 is an enlarged sectional detail on line indicated by 7—7, Figure 3.

A suitable frame is provided comprising, in this instance, longitudinal front and rear strips 1, 2, end strips 3 and front corner standards 4, all of angular cross section. The upper ends of the standards 4 are provided with ears 5 which are bent over the end and front walls 6, 7 of the case. The walls 6, 7, in this instance, are of glass. The rear wall 8 of the case forms a hinged door, the hinges being indicated at 9 and connecting the door with the strip 2. The ends of the door 8 terminate in flanges 10 which overlap the rear margins of the end walls 6.

Hinged at 11 to the upper margin of the door 8 is a lid 12 provided with a knob 13. The lid 12 is provided with end flanges 14 overlapping the upper margins of the end walls 6, and is also provided with a longitudinal flange 15 overlapping the front wall 7.

The lower ends of the standards 4 are provided with tongues 16 which project through slots 17 formed in the strips 1, 3, said tongues being bent beneath the strips to hold said strips and standards 4 together. A bottom 22 is laid loosely upon the strips 1, 2, 3.

The construction hereinbefore described produces a box-shaped receptacle which is indicated in general by the character 18. Positioned in the receptacle 18 is a perforate tray 19 provided with a flange 20, the perforations being indicated at 21. This tray 19 may be placed with the flange turned downwardly and resting on the bottom 22 of the receptacle, as shown in Figure 4, or the tray may be placed on the bottom 22 with its flange up-turned, as shown in Figures 1, 2 and 3.

When the tray 19 is in the position shown in Figure 4, it is adapted to hold stacks of ice cream cones 23, the lowermost cone of each stack being inserted in one of the perforations 21. The perforations 21 are sufficiently large to allow the cones inserted therein to project a considerable distance beneath the tray 19, and the lower projecting ends of said cones are inserted in perforations 24 formed in a supplemental perforate tray 25 which telescopes within the tray 19, the tray 25 also having a flange 36 adapted to rest upon the floor 22 as shown in Figure 4. However, the flange 36 is narrower than the flange 20 so as to space the trays 19, 25 a predetermined distance from each other.

When desired, the tray 25 may be utilized as a shelf, and under such circumstances it will be withdrawn from the tray 19, and the tray 19 may then be turned over as shown in Figure 2, so as to increase the depth of the space above the tray 19. The tray 25 is supported by a pair of hangers, each comprising cross members 26 pivotally connected to each other by rivets 27. The upper ends of the members 26 are bent into the form of hooks 28 adapted to extend over the upper edges of the end walls 6 so as to support the hanger. The lower ends of the members 26 of each pair are bent to form laterally extending hooks 29 adapted to hook over the margins of two of the perforations 24, as clearly shown in Figure 2. These hangers are readily detached from the tray 25 by simply spreading the lower ends of the members 26 sufficiently to disengage the hooks 29 so that said hooks can be withdrawn from the perforations. When it is not desired to employ the tray 25 as a shelf, the hangers may be detached and laid away.

It is desirable, in some instances, to place candy or other articles in bulk in the receptacle, and under such circumstances the tray 19 will preferably be positioned as in Figures 2 and 3. The tray 25 may be detached and laid away or, if desired, it may be telescoped within the tray 19, as indicated in broken lines in Figure 2. It now becomes advisable, because of the tendency of the loose articles to discharge through the open door 8, to prevent opening of the door when the lid 12 is raised to abstract some of the contents from the receptacle. To hold the door in closed position regardless of the opening and closing of the lid 12, I provide a latch at opposite ends of the door, said latches being indicated in general by the character 30 and being detachable when it is desired to convert the case into a receptacle for ice cream cones or packaged goods.

The latches 30 are constructed as follows: Each latch comprises a straight arm 31 terminating in a hook 32 adapted to be engaged with an eye 33 formed by the hinge 11. The forward end of the arm 31 terminates in a laterally projecting finger 34 adapted to extend over the front face of the standard 4. The finger 34 is angular so as to also extend downwardly adjacent the inner face of a lug 35 projecting forwardly from the standard 4. The finger 34 and lug 35 prevent the forward end of the arm 31 from being accidentally thrown out of latching position. When it is not desired to use the latches 30, they may be readily released at their forward ends, unhooked from the eyes 33 and laid away.

It is to be noted that the advantage of having spaced trays with perforations of different sizes in the respective trays is that the cones will fit better and the stacks will be better held against tilting than when a single member having tapered holes is used, because the cones vary somewhat in size and frequently could not accurately fit such tapered holes. By using the spaced trays the uper tray supports the cones and the lower tray merely engages the lower ends of the cones to prevent tilting thereof.

I claim:

1. In a sanitary case, the combination of a receptacle having a door hinged at its lower end and forming the rear wall of the receptacle, the receptacle having a lid hinged to the upper margin of the door and forming the top of the receptacle, the hinges of the lid forming eyes, and arms having hooks engaging the eyes and releasably fastened to the receptacle to hold the door closed.

2. In a sanitary case, a receptacle having a lid, hangers having hooks at their upper ends engaging over the upper margins of the end walls of the receptacle and having laterally extending hooks at their lower ends, and a tray having perforations engaged by the lower hooks.

3. In a sanitary case, a frame comprising front, rear and end strips angular in cross section and standards of angular cross section at the front corners, end and front walls resting on the end and front strips, respectively, the upper ends of the standards having tongues bent over the upper margins of the end and front walls of the receptacle and the lower ends of the standards having tongues projecting through the front and side strips, the lower tongues being bent beneath said strips, and a door hinged at its lower edge to the rear strip.

Signed at Los Angeles, California, this 8th day of April, 1921.

SAMUEL A. KORNSWEET.

Witnesses:
GEORGE H. HILES,
L. BELLE WEAVER.